(12) United States Patent
Sabet et al.

(10) Patent No.: US 8,305,877 B2
(45) Date of Patent: Nov. 6, 2012

(54) SYSTEM AND METHOD FOR DISTRIBUTED FAULT SENSING AND RECOVERY

(75) Inventors: Sameh A. Sabet, Freehold, NJ (US); Jonathan M. Liss, Marlboro, NJ (US); James C. Giotis, Howell, NJ (US); Franklin W. Kerfoot, III, Red Bank, NJ (US)

(73) Assignee: Tyco Electronics Subsea Communications LLC, Morristown, NJ (US)

( * ) Notice: Subject to any disclaimer, the term of this patent is extended or adjusted under 35 U.S.C. 154(b) by 541 days.

(21) Appl. No.: 12/557,388

(22) Filed: Sep. 10, 2009

(65) Prior Publication Data

US 2011/0058806 A1    Mar. 10, 2011

(51) Int. Cl.
H04L 12/26    (2006.01)
(52) U.S. Cl. ........................... 370/216; 370/242
(58) Field of Classification Search .................. 370/218, 370/250, 389, 216, 242, 396, 400, 244
See application file for complete search history.

(56) References Cited

U.S. PATENT DOCUMENTS

| | | | |
|---|---|---|---|
| 6,715,097 B1 | 3/2004 | Kidder et al. | |
| 6,725,392 B1 * | 4/2004 | Frey et al. | 714/6.12 |
| 6,893,183 B2 | 5/2005 | Levison | |
| 6,895,183 B2 | 5/2005 | Shimomura et al. | |
| 7,197,246 B2 | 3/2007 | Shimomura et al. | |
| 7,248,561 B2 * | 7/2007 | Ishibashi et al. | 370/228 |
| 7,415,211 B2 | 8/2008 | Feinberg et al. | |
| 7,430,373 B2 | 9/2008 | Yamashita | |
| 2002/0003639 A1 | 1/2002 | Arecco et al. | |
| 2003/0043427 A1 | 3/2003 | Robidas | |
| 2005/0259571 A1 | 11/2005 | Battou | |
| 2006/0171717 A1 | 8/2006 | Kikuchi | |
| 2007/0036544 A1 | 2/2007 | Fukashiro | |
| 2007/0121487 A1 | 5/2007 | Klos et al. | |
| 2007/0237521 A1 | 10/2007 | Meyer | |
| 2007/0264011 A1 | 11/2007 | Sone | |
| 2008/0201462 A1 | 8/2008 | Liss et al. | |
| 2009/0310482 A1 * | 12/2009 | Asaie et al. | 370/225 |

OTHER PUBLICATIONS

International Search Report and Written Opinion dated Oct. 22, 2010 issued in related International Patent Application No. PCT/US10/48089.

* cited by examiner

Primary Examiner — Brenda H Pham
(74) Attorney, Agent, or Firm — Grossman, Tucker, Perreault & Pfleger, PLLC

(57) ABSTRACT

A method and system for distributed fault sensing and recovery in a communication system. A master controller is provided in each cable station of the system. Each master controller receives local alarms, e.g. aggregated alarms from associated shelf controllers, and may receive remote alarms from other master controllers. Local and remote alarms are compared to a profile provisioned in the master controllers for determining whether to perform a fault recovery function.

20 Claims, 7 Drawing Sheets

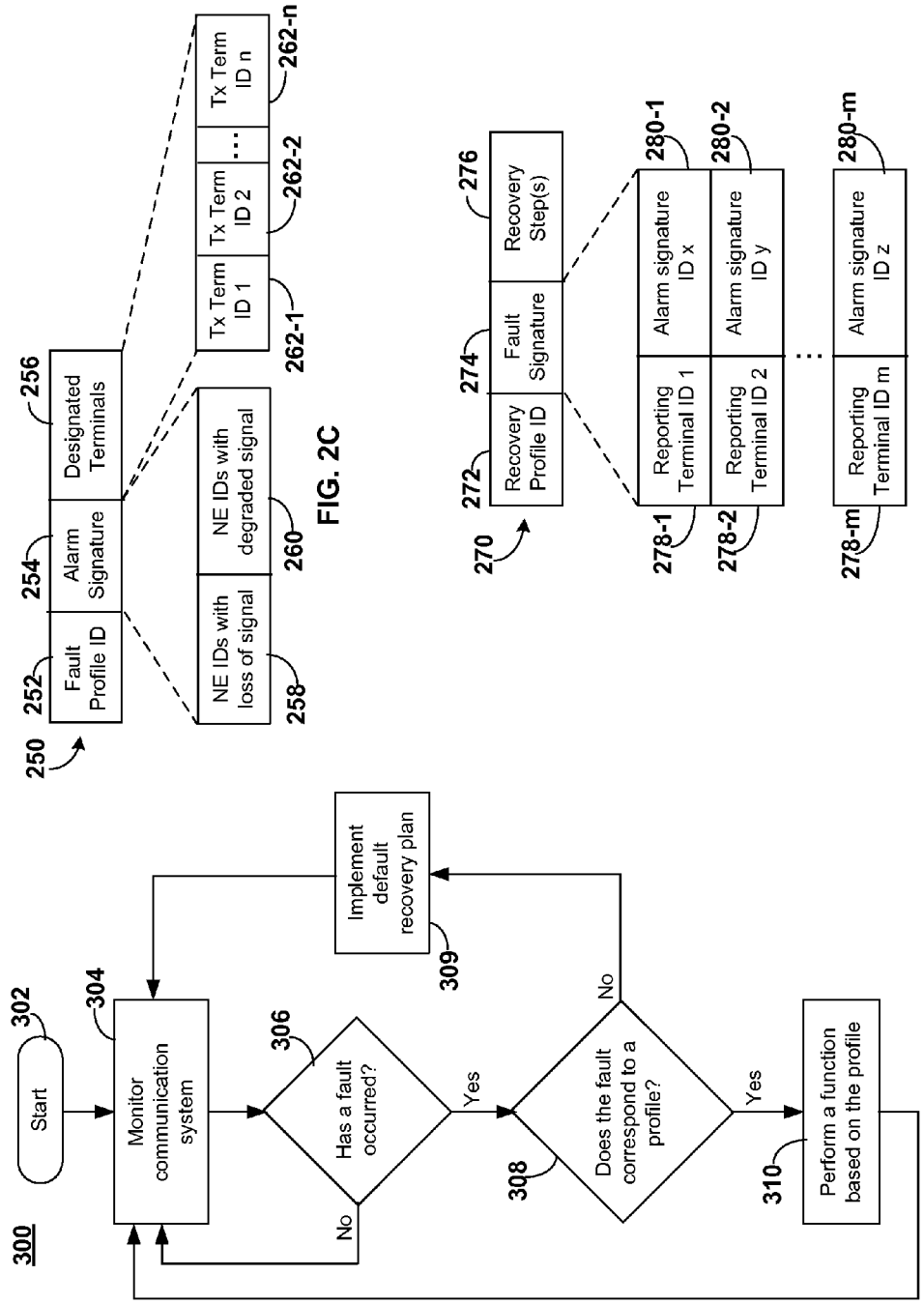

US 8,305,877 B2

SYSTEM AND METHOD FOR DISTRIBUTED FAULT SENSING AND RECOVERY

TECHNICAL FIELD

The present disclosure relates to distributed fault sensing and recovery in a communication system.

BACKGROUND

Fault sensing and recovery may be conducted at different levels in various types of optical transmission networks to avoid network failures and to assure network performance. For example, an element management system (EMS) may be used to supervise, manage and detect faults in network elements of a network. A network management system (NMS) may be used to supervise and manage the overall optical network by communicating with several EMSs. Based on information derived from peer EMSs, any EMS may initiate fault recovery without requiring centralized NMS participation.

In an optical communication system, for example, terminal or cable stations may be interconnected by cable segments to form a network. The network elements in an optical communication system may include equipment located at a cable station (e.g., terminal equipment and power feed equipment) as well as equipment connected to the cable station (e.g., repeaters and equalizers). In such a system, an EMS may be located at a cable station (or at a separate location) and used to manage the network elements associated with this cable station. An NMS may be located at one of the cable stations or at a separate location for managing the overall optical communication system and performing fault recovery based on communication with the EMSs.

Undersea optical fiber communication systems may include a relatively long trunk segment that may be terminated at a transmitting and/or receiving trunk terminal or cable station. The optical fiber transmission system may further include one or more optical devices, e.g., branching units and/or repeaters, situated along its trunk. Each branching unit (BU) may be connected to a branch segment that terminates in a transmitting and/or receiving branch terminal or cable station. Each branching unit may include an optical add/drop multiplexer (OADM) configured to add and/or drop data signals at the branching unit. Each trunk and/or branch terminal may be on or near dry land. The relatively long trunk system may run underwater, e.g., along an ocean floor. The optical devices may also be positioned on the ocean floor at a relatively long distance, e.g., fifty kilometers or more, from dry land.

Each trunk segment and/or branch segment may include one or more optical fibers. Each optical fiber may be configured to carry a plurality of multiplexed optical channels using, e.g., wavelength division multiplexing. An optical fiber may be susceptible to a fault, e.g., a cut or damaged fiber that may degrade or prevent propagation of one or more signals. The degradation and/or loss of signal may be detected at a receiving branch or trunk terminal.

Optical fiber communication systems that include OADMs may present special challenges for fault recovery in the event of a trunk segment or branch segment failure. There may be significant interdependence between trunk and branch traffic. For example, in some situations, trunk traffic may be impaired as a result of a branch fault. In another example, a trunk fault may not affect signals transmitted from a surviving portion of the trunk to a branch, but signals from the branch to the surviving portion of the trunk may be adversely affected. Whether traffic is affected and to what degree depends on several factors including OADM architecture, lengths of surviving fiber segments, location and type of fault, relative distances between branching units and trunk terminals and/or powering configuration of each branching unit.

Generally, alternate routes that include additional optical fibers may not be available for rerouting a signal from a faulty fiber segment, e.g., protection switching. This may be especially true of undersea and/or remote terrestrial optical communication systems where laying optical fibers may be difficult and expensive. Additionally or alternatively, for reliability considerations in fault detection and communication, it may be desirable that fault recovery not be reliant on a single centralized network management system but rather be distributed over the system. Accordingly, there is a need for distributed fault sensing and recovery in a communication system.

Fault recovery in a OADM network involves limiting the impairments experienced by the portions of the network not directly affected by the fault because the resulting optical network signal characteristics are no longer compatible with the planned optical amplification scheme. During recovery, optical signal sources are managed to recreate, as much as possible, the original optical network signal loading.

BRIEF DESCRIPTION OF THE DRAWINGS

Reference should be made to the following detailed description which should be read in conjunction with the following figures, wherein like numerals represent like parts:

FIGS. 2C and 2D are block diagrams illustrating an exemplary fault profile and an exemplary recovery profile, respectively;

FIGS. 3A and 3B are flow charts illustrating methods of fault monitoring and recovery consistent with the present disclosure;

DETAILED DESCRIPTION

Figure 1:
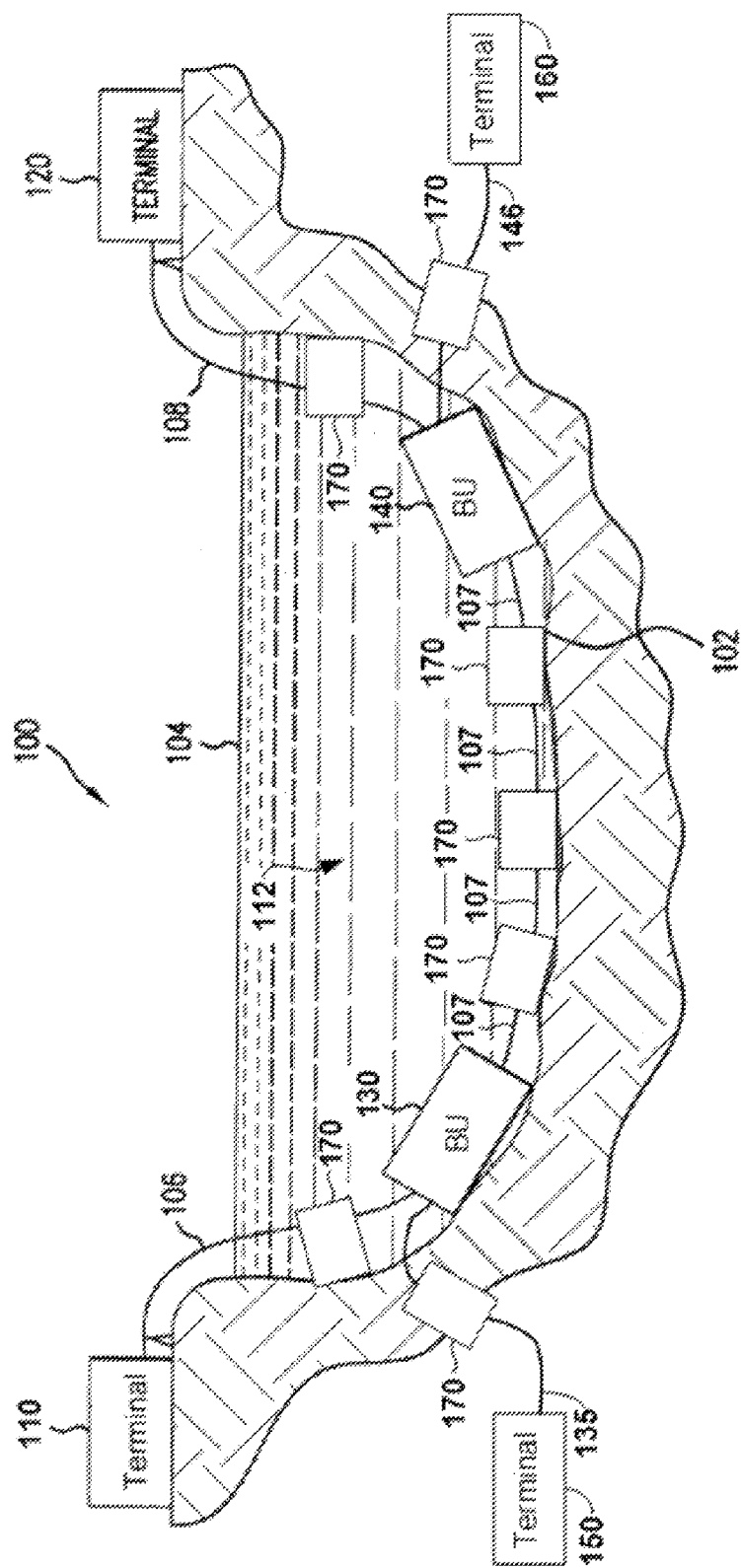
FIG. 1 is a schematic illustration of an optical communication system consistent with an embodiment of the present disclosure.

In general, a distributed fault sensing and recovery system and method consistent with the present disclosure provides an autonomous "best effort" adjustment of transmitter parameters in response to a detected fault in an optical communication network. The optical communication network may include cable stations, optical fiber segments, branching units (including OADMs) and/or repeaters. Fault sensing and recovery may be distributed across the optical communication network without reliance on a network management system (NMS) for fault management.

In one embodiment consistent with the present disclosure, one or more cable stations may include a controller configured to monitor the communication network, to determine whether or not a fault has occurred and to perform a fault recovery function if a fault occurs that corresponds to a provisioned profile. For example, a controller may be configured to sense or detect faults on received channels (local faults) and/or communicate local faults to controllers at remote cable stations responsible for transmitting on the received channels. The controller may be further configured to adjust local transmitter parameters if the controller receives notification of detected faults (remote faults) from a controller at a remote cable station. Transmitter parameters adjusted may include channel transmitted power level, pre-emphasis, information channel selection and/or distribution of loading tones. A controller may thus be configured to detect and communicate a local fault and may be configured to respond to a detected and communicated remote fault.

In the event of a fault resulting in a loss of signal on several channels, distributed sensing and recovery consistent with the present disclosure may maximize a number of recovered channels without requiring a completely healthy control architecture. For example, if a controller is disconnected by, e.g., a fault, another controller or controllers may still adjust their transmitter parameters, resulting in at least some channels being automatically recovered. Distributed sensing and recovery consistent with the present disclosure can also result in a reduced response time between a fault occurrence and fault recovery based at least in part on localized decision-making and/or parallel processing.

A system and method consistent with the present disclosure, may be used in systems where providing multiple redundant communication paths may be relatively difficult and/or costly, for example, in undersea optical communication systems. In such a system, providing a second communication path configured to carry channels that have been protection switched from a first communication path experiencing a fault may not be feasible. For example, fault recovery methods in undersea systems may avoid protection switching and, instead, may modify communication between one or more cable stations on the first optical path by, e.g., adjusting transmitter parameters. In this manner fault detection and recovery may be implemented without reliance on a second, redundant communication path. Although exemplary embodiments are described in the context of an undersea optical communication system, the systems and methods described herein may also be used in terrestrial communication systems.

Turning now to FIG. 1, there is illustrated an exemplary optical communication system 100 consistent with the present disclosure. Those skilled in the art will recognize that the system 100 has been depicted in highly simplified form for ease of explanation. The optical communication system 100 includes trunk terminals 110, 120 coupled to a trunk path 112. The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals.

The trunk path 112 may include a plurality of optical cable segments, e.g. cable segments 106, 107, 108, for carrying optical signals. Each cable segment may include one or more sections of optical fiber cable including optical fiber pairs and one or more repeaters 170 to provide a transmission path for bi-directional communication of optical signals between the trunk terminals 110, 120.

One or more branching units, e.g., branching units 130 and 140, may be coupled to the trunk path between the trunk terminals 110, 120. Each branching unit 130, 140 may be further coupled to a branch terminal, e.g., branch terminals 150 and 160, respectively, through an associated branch path 135, 146, respectively, perhaps through one or more repeaters 170 and linking optical cables. The system 100 may therefore be configured to provide bi-directional communication of optical signals between two or more terminals 110, 120, 150, 160. For ease of explanation, the description herein may refer to transmission from one terminal to another. The system 100 may be configured, however, for bi-directional or uni-directional communication between any of the terminals 110, 120, 150, 160.

The components in the trunk and branch paths may include known configurations for achieving their intended functionality. The repeaters 170, for example, may include any known optical amplifier/repeater configuration that compensates for signal attenuation on the transmission path. For example, one or more of the repeaters may be configured as an optical amplifier, such as an erbium doped fiber amplifier (EDFA), a Raman amplifier, or a hybrid Raman/EDFA amplifier. Also, one or more of the repeaters may be provided in a known optical-electrical-optical configuration that regenerates an optical signal by converting it to an electrical signal, processing the electrical signal and then retransmitting the optical signal.

The optical communication system 100 may be configured as a long-haul system, e.g. having a length between at least two of the terminals of more than about 600 km, and may span a body of water. When used to span a body of water, e.g. an ocean 104, amplifiers 170 and/or branching units 130 and/or 140 may be seated on the ocean floor and the trunk path 112 path may span between beach landings. A plurality of repeaters, branching units and optical media links may be disposed beneath the water and/or over land.

A component of the optical communication system 100 may be susceptible to one or more faults. For example, an optical cable segment associated with a branch path and/or a trunk path may be damaged or cut. Each fault may degrade transmission of one or more optical signals on one or more channels associated with that segment. In some instances, the degradation may result in a loss of a signal. A receiving terminal may detect one or more lost and/or degraded signals. A receiving terminal may be configured to communicate a detected fault to a transmitting terminal that may be configured to adjust a parameter associated with each transmitted signal and/or channel affected by the fault to implement fault recovery. Examples of parameters that may be adjusted include channel transmitted power level, pre-emphasis, information channel selection and/or distribution of loading tones. Fault detection, communication and recovery may be autonomous and distributed within the optical communication system. In other words, fault detection, communication and recovery may be implemented without input from a network management system.

Figure 2A:
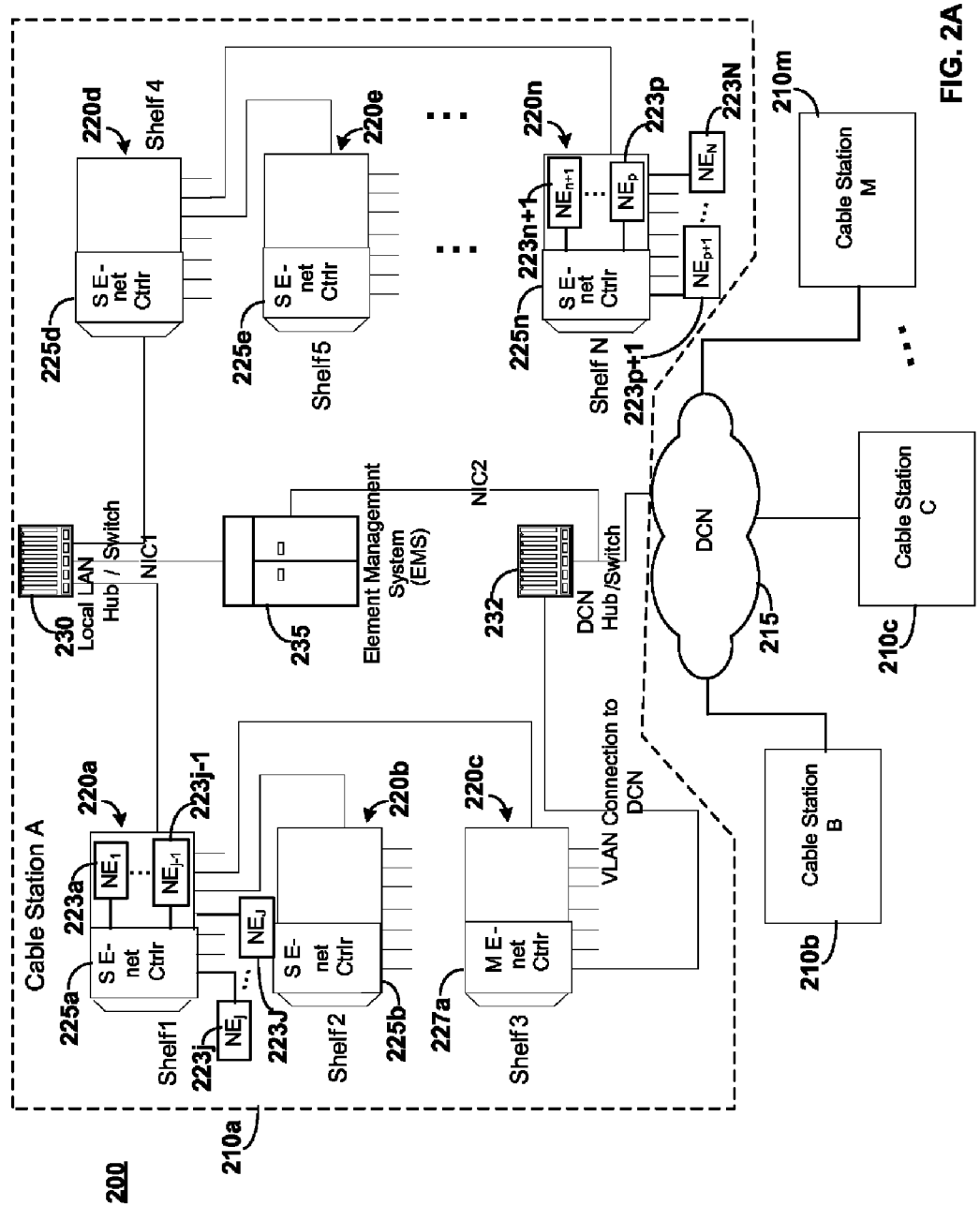
FIG. 2A is a block diagram of an optical communication system configured for distributed fault monitoring and recovery consistent with the present disclosure.

Turning now to FIG. 2A, there is depicted a block diagram of a system 200 configured to provide distributed fault sensing and recovery for an optical communication system, e.g., system 100. The system 200 may include a plurality of cable stations 210a . . . 210m coupled to a data communications network ("DCN") 215. Each cable station 210a . . . 210m may be configured to transmit and receive the health status of optical data signals over, e.g., the DCN 215. Additionally or alternatively, each cable station 210a . . . 210m may be configured to transmit and/or receive control signals from another cable station and/or a network element. Network elements in an optical communication system may include equipment located at a terminal or cable station (e.g., terminal equipment and power feed equipment) as well as equipment coupled to the cable station (e.g., repeaters, equalizers and multiplexers including OADMs). A network element may be configured to communicate a status, including a fault, to a cable station 210a . . . 210m. For example, a fault may include a loss of signal, a degraded signal and/or a fault within the network element itself.

A cable station, e.g., cable station A 210a, may include a plurality of shelves 220a . . . 220n that may each include and/or be coupled to a plurality of network elements, e.g., network elements 223a . . . 223j–1, 223j . . . 223J corresponding to Shelf 1 220a and network elements 223n+1 . . . 223p, 223p+1 . . . 223N corresponding to Shelf N 220n. Each of the other shelves may likewise include a plurality of network elements. Each of the plurality of shelves 220a, . . . , 220n may include an associated controller, e.g., a shelf controller 225a, . . . , 225n, configured to aggregate alarms for the shelf. Communication may be via an Ethernet protocol or another protocol known to those skilled in the art. For example, each network element 223a . . . 223j–1, 223j . . . 223J . . . 223n+1 . . . 223p, 223p+1 . . . 223N may be coupled to a channel and may be configured to generate an alarm in response to a loss or degradation of an optical signal on that channel. The shelf controller 225a . . . 225n may then receive and aggregate alarms from each channel associated with the shelf.

The shelf controllers 225a . . . 225n may be coupled via a LAN (Local Area Network) and may be configured to communicate with each other over the LAN. The LAN may include a local LAN hub and/or switch 230. For example, the LAN may be a virtual LAN and each shelf controller may have access to all shelf backplanes. At least one shelf controller 225a . . . or 225n may be configured as a master controller, e.g., master controller 227a. The master controller 227a may be configured to receive aggregated alarms from each of the other shelf controllers 225a . . . 225n as well as to aggregate alarms for its shelf, i.e., the shelf's associated network elements.

Each cable station 210a . . . 210m may include at least one master controller and a plurality of shelf controllers 225a . . . 225n. A local master controller, e.g., master controller 227a, may be coupled to one or more remote master controllers located at, e.g., cable station B 210b, cable station C 210c . . . cable station M 210m. For example, the master controllers may be coupled to each other over the DCN 215 via a virtual LAN ("VLAN") or a dedicated cable station Ethernet sub-network. The VLAN may include a DCN hub/switch, e.g., DCN hub/switch 232, at each cable station that is coupled to the DCN 215. In this manner, communication between the master controllers may be independent of other DCN 215 traffic and may be relatively faster. Additionally or alternatively, communication via the VLAN may be configured to isolate the master controllers from other DCN 215 messaging that may be intended for an Element Management System (EMS), e.g., EMS 235.

Accordingly, each terminal 110, 120, 150, 160 or cable station 210a . . . 210m may include a master controller and a plurality of shelf controllers. The master controller and each shelf controller may be configured to receive alarms from one or more network elements coupled to it. The master controller may be configured to aggregate its received alarms. Each shelf controller may be configured to aggregate its received alarms and to provide an indication of the aggregated alarms to the local master controller for the cable station. Each local master controller may be configured to receive the indication of the aggregated alarms, and based on a provisioned fault profile, may notify one or more remote master controllers of the fault. Each master controller may be configured to receive a notification of the fault. Depending on a nature of the fault, a master controller may receive a plurality of fault notifications from a plurality of controllers as a result of one fault. In one embodiment, each master controller may be configured to notify all other master controllers of the fault. In this embodiment, each master controller may be considered to be "all-knowing", i.e., may be configured to be aware of a status of the entire network. In another embodiment, each master controller may be configured to notify certain other master controllers of the fault, based, at least in part, on the fault. In this embodiment, each master controller may not be aware of the status of the entire network. Each master controller may be configured to perform a fault recovery function including one or more recovery steps in response to the one or more fault notifications. In this manner, distributed fault detection and recovery may be implemented without control input from an NMS.

Figure 2B:
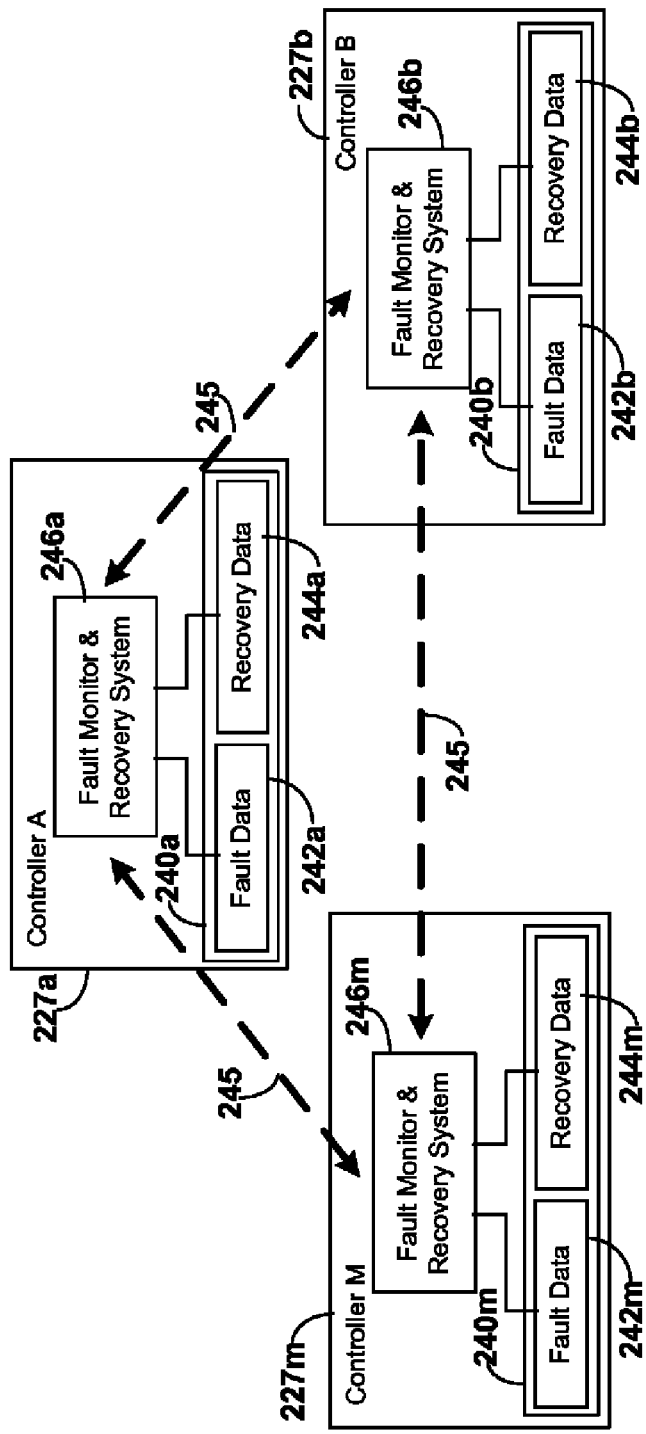
FIG. 2B is a block diagram illustrating data structures and communication between controllers configured for distributed fault monitoring and recovery consistent with the present disclosure.

FIG. 2B is a block diagram illustrating a plurality of master controllers including master controller 227a and one or more other master controllers 227b, . . . , 227m. Each master controller 227a . . . 227m may be provisioned with a fault monitor and recovery system 246a . . . 246m, e.g., at communication system deployment and/or communication system upgrade. Each fault monitor and recovery system 246a . . . 246m may be configured for fault sensing, fault reporting and/or fault recovery.

Each master controller 227a . . . 227m may be provisioned with one or more data structures 240a . . . 240m, e.g., at system deployment and/or system upgrade. Each data structure may include fault data 242a . . . 242m and recovery data 244a . . . 244m. Fault data may include one or more fault profiles, e.g., fault profile 250 (FIG. 2C), and recovery data may include one or more recovery profiles, e.g., recovery profile 270 (FIG. 2D). Fault data and recovery data may be master controller specific, i.e., may depend on the particular master controller 227a, . . . or 227m. Each profile may be based on a configuration of the optical communication network, e.g., wavelength allocation, and/or channels that may be added and/or dropped at each branching unit by, e.g., OADMs. For example, each profile may be created by an optical communication network designer and may be provided as part of a deployment or upgrade of the optical communication system. Each profile may be customized based on loading, system topology, etc.

Turning to FIG. 2C, there is depicted an exemplary fault profile 250. A fault profile 250 may include a fault profile identifier 252 and an alarm signature 254. For example, each alarm signature 254 may include a listing 258 of channel identifiers for channels with lost signals and/or a listing 260 of channel identifiers for channels with degraded signals. Each fault profile 250 may further include a listing 256 of one or more transmitting terminal identifiers, e.g., transmitting terminal identifiers 262-1, 262-2 . . . 262-n, designating transmitting terminals to be notified of the fault. The designated transmitting terminals may be configured to adjust transmitter parameters to implement fault recovery. Fault recovery may be configured to minimize an effect of a fault. For example, channel transmitted power may be increased for a channel degraded by the fault. In another example, a frequency of one or more loading tones may be adjusted in an attempt to reduce an effect of the fault. A controller, e.g., master controller 227a, at each receiving terminal that has detected a fault corresponding to a provisioned alarm signature may be configured to provide a fault report to a controller, e.g., controller 227b . . . 227m, at each of the designated transmitting terminals. A fault report 245 may include a reporting terminal identifier and an alarm signature identifier.

For example, a reporting terminal identifier may correspond to a cable station and/or master controller that has a detected fault.

Turning to FIG. 2D, there is depicted an exemplary recovery profile 270. Each recovery profile 270 may include a recovery profile identifier 272 and a fault signature 274. For example, each fault signature 274 may include a listing of identifiers 278-1, 278-2 . . . 278-m for each reporting terminal and an associated alarm signature or alarm signature identifier 280-1, 280-2 . . . 280-m for each reporting terminal. Each associated alarm signature or alarm signature identifier 280-1, 280-2 . . . 280-m may be based on the particular channels at the reporting terminal that are experiencing a fault. Each recovery profile 270 may further include recovery steps 276 or an identifier corresponding to recovery steps to be performed at each transmitting terminal based at least in part on the fault signature 274. Each transmitting terminal that is capable of receiving a fault notification (i.e., is not isolated by the fault) may perform its associated recovery steps.

A terminal may be both a transmitting terminal and a receiving terminal. Accordingly, a controller, e.g., controller 227a, located at the terminal may be configured to report local faults and/or perform recovery steps for remote faults. In this manner, distributed fault recovery may be performed, maximizing the number of channels recovered, without input from an NMS, without requiring access to all transmitting terminals and without reliance on protection switching for fault recovery.

Turning now to FIG. 3A, there is depicted a flow chart 300 illustrating a method of fault monitoring and recovery consistent with the present disclosure. Flow begins at Start 302. A communication system may be monitored 304 by, e.g., a controller. Whether a fault has occurred may be determined 306. If a fault has not occurred, flow may return to monitoring 304 the communication system. If a fault has occurred, whether the fault corresponds to a profile may be determined 308. If the fault does not correspond to a profile, a default recovery plan may be implemented 309. If the fault corresponds to a profile, a function may be performed 310 based on the profile. Flow may then return to monitoring 304 the communication system.

For example, a master controller may monitor 304 the communication system. The master controller may determine 306 whether a fault has occurred based on one or more alarms received from its associated network elements and/or local shelf controllers and/or communications received from one or more remote controllers. A fault may include a lost or degraded signal on one or more communication channels. If a fault has occurred, the master controller may determine 308 whether the fault corresponds to a profile, e.g., a fault profile or a recovery profile contained in a data structure, e.g., data structure 240a, depending at least in part on whether the fault is local, e.g., notification received from a shelf controller or remote, e.g., notification received from another (remote) master controller. If the fault corresponds to a fault profile (i.e., local fault), the master controller may perform 310 the function of communicating the fault to transmitting stations listed in the fault profile. If the fault corresponds to a recovery profile (i.e., remote fault), the master controller may perform 310 the function of one or more recovery steps included in the recovery profile. If the fault is a local fault but does not correspond to a provisioned fault profile, the master controller may implement 309 a default recovery plan, e.g., alarm requesting manual intervention. If the fault is a remote fault that does not correspond to a provisioned recovery profile, the master controller may implement 309 a default recovery plan, e.g., increase each channel transmitted power.

Figure 3B:
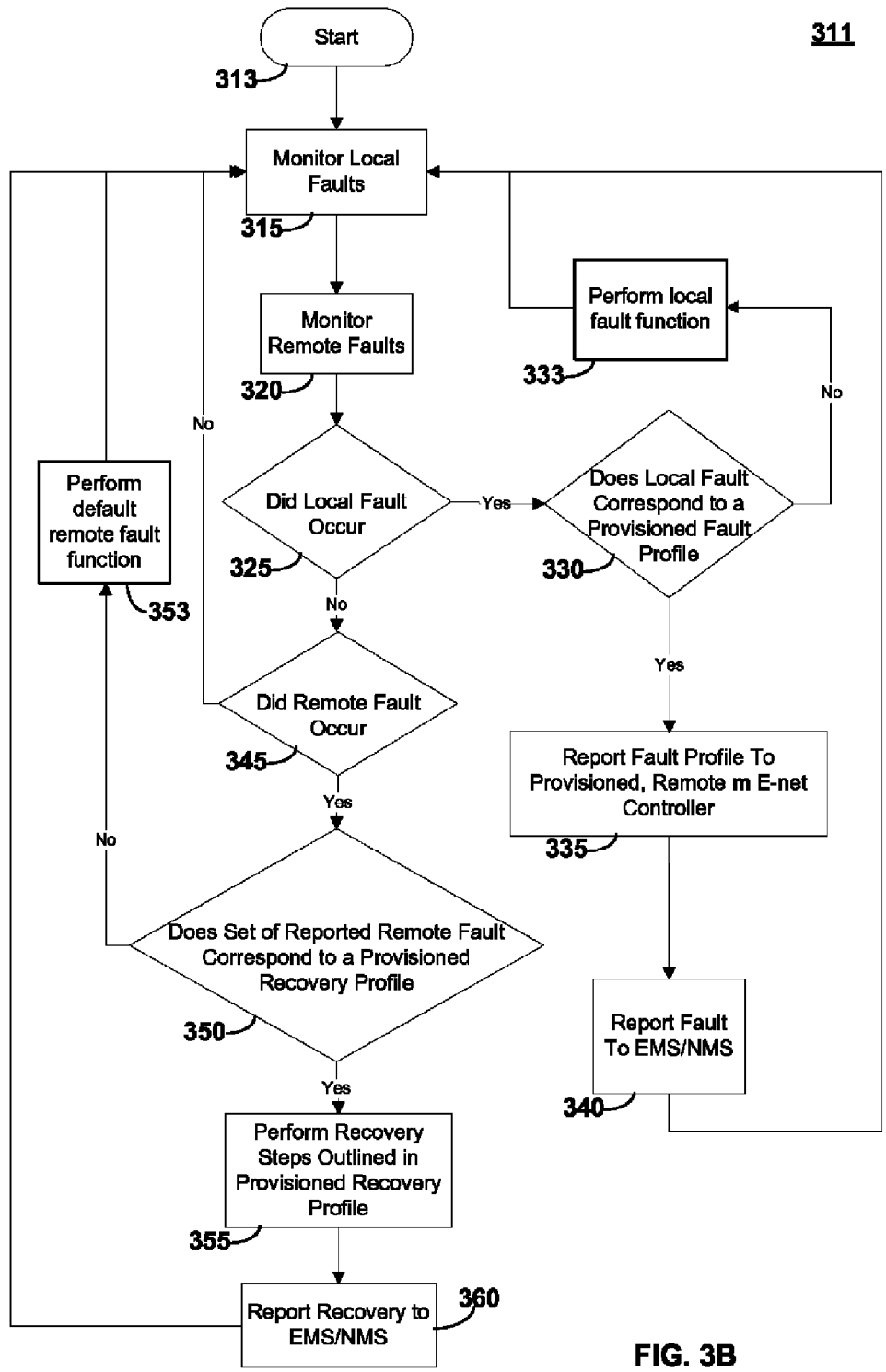

Turning now to FIG. 3B, there is depicted a more detailed flow chart 311 illustrating a method of fault monitoring and recovery consistent with the present disclosure. Flow begins at Start 313. A local master controller, e.g., master controller 227a at cable station A 210a, may monitor 315 local faults, e.g., alarms detected at shelf controllers 225a . . . 225n at cable station A 210a as well as alarms received from its associated network elements. An alarm may signify a lost or degraded signal on one or more communication channels. For example, the local master controller may poll the shelf controllers for alarms. In another example, a shelf controller may notify the local master controller when an alarm is detected from a network element. Each shelf controller may aggregate a plurality of alarms prior to notifying the local master controller. Each shelf controller may determine whether to notify the local master controller of an alarm, e.g., a detected lost or degraded signal on one or more channels.

The local master controller may monitor 320 remote faults. For example, the local master controller 227a may poll for communications from a remote master controller indicating that a fault has occurred. In another example, a remote master controller may notify the local master controller that a reportable fault has occurred. A remote master controller may be located at any of cable stations coupled to the local cable station over, e.g., the DCN and/or VLAN. For example, considering master controller 227a of cable station A 210a as the local master controller, a remote master controller may be located at cable station B 210b, cable station C 210c, . . . , and/or cable station M 210m.

The local master controller may determine 325 whether a local fault has occurred. A local fault may include one or more alarms. If a local fault has occurred, the local master controller may determine 330 whether the local fault corresponds to a provisioned fault profile. For example, the local master controller may determine whether the local fault corresponds to a provisioned fault profile by comparing the local fault with an alarm signature, e.g., alarm signature 254, of each fault profile in provisioned fault data, e.g., provisioned fault data 242a, and determining whether the local fault corresponds to the alarm signature. A local fault may be determined to correspond to an alarm signature if at least a portion of the network elements designated in the alarm signature is experiencing a fault.

The one or more faults may be communicated to the local master controller from, e.g., shelf controllers. For example, a network element may detect a fault on an associated channel. Other network elements may detect faults on other associated channels. A plurality of faults may indicate that an optical cable segment has been damaged or cut. The particular channels affected may provide an indication of a location of a damaged or cut cable segment, e.g., a branch and/or a trunk. Each network element may communicate its detected fault to its associated shelf controller. Each shelf controller may aggregate the faults received from the network elements and may determine whether to communicate the detected faults to the local master controller. For example, each shelf controller may determine whether to communicate the detected faults based on the channels affected and/or whether an associated signal is degraded or lost.

The local master controller may receive aggregated fault information from each shelf controller that has detected a fault and has communicated the detected fault to the local master controller. The local master controller may aggregate faults received from its associated network elements. The local master controller may combine the aggregated fault information. The local master controller may then determine whether the combined faults correspond to a provisioned alarm signature. For example, the local master controller may compare the combined faults with the alarm signature in each fault profile in the fault data portion of its provisioned data structure. If the combined faults do not correspond to a provisioned alarm signature, the local master controller may perform 333 a local fault function. For example, the local fault function may include providing a local alarm requesting manual intervention. Process flow may then return to monitoring local faults 315.

If the combined faults correspond to a provisioned alarm signature, the local master controller may report 335 the fault to one or more remote master controllers. Each remote master controller may be configured to adjust a transmitter parameter in response to the report. For example, the local master controller may report the fault to each remote master controller at each cable station, i.e., designated terminals 262-1 . . . 262-n, designated in the provisioned fault profile corresponding to the alarm signature. For example, a fault report may include a reporting terminal identifier and an alarm signature identifier. The local master controller may then report 340 the fault or faults to the EMS and/or NMS. Process flow may then return to monitoring 315 local faults.

In this manner local faults may be detected and communicated to remote cable stations. In one embodiment, a receiving terminal may detect a reportable fault and may communicate the fault to one or more transmitting terminals. Each transmitting terminal may then adjust one or more transmission parameters in response to one or more fault notifications to implement fault recovery. If a transmitting terminal is unable to receive notification of the fault, e.g., because the fault has affected communication to the transmitting terminal, other transmitting terminal(s) that have received notification may nonetheless implement their associated recovery steps. Accordingly, recovery may proceed as a "best effort" based on the recovery steps actually implemented rather than an "all or none" recovery effort that may fail if a remote controller is unable to perform its designated recovery steps. For example, recovery may modify communication on a communication path, i.e., without protection switching one or more channels to a redundant communication path.

Figure 4:
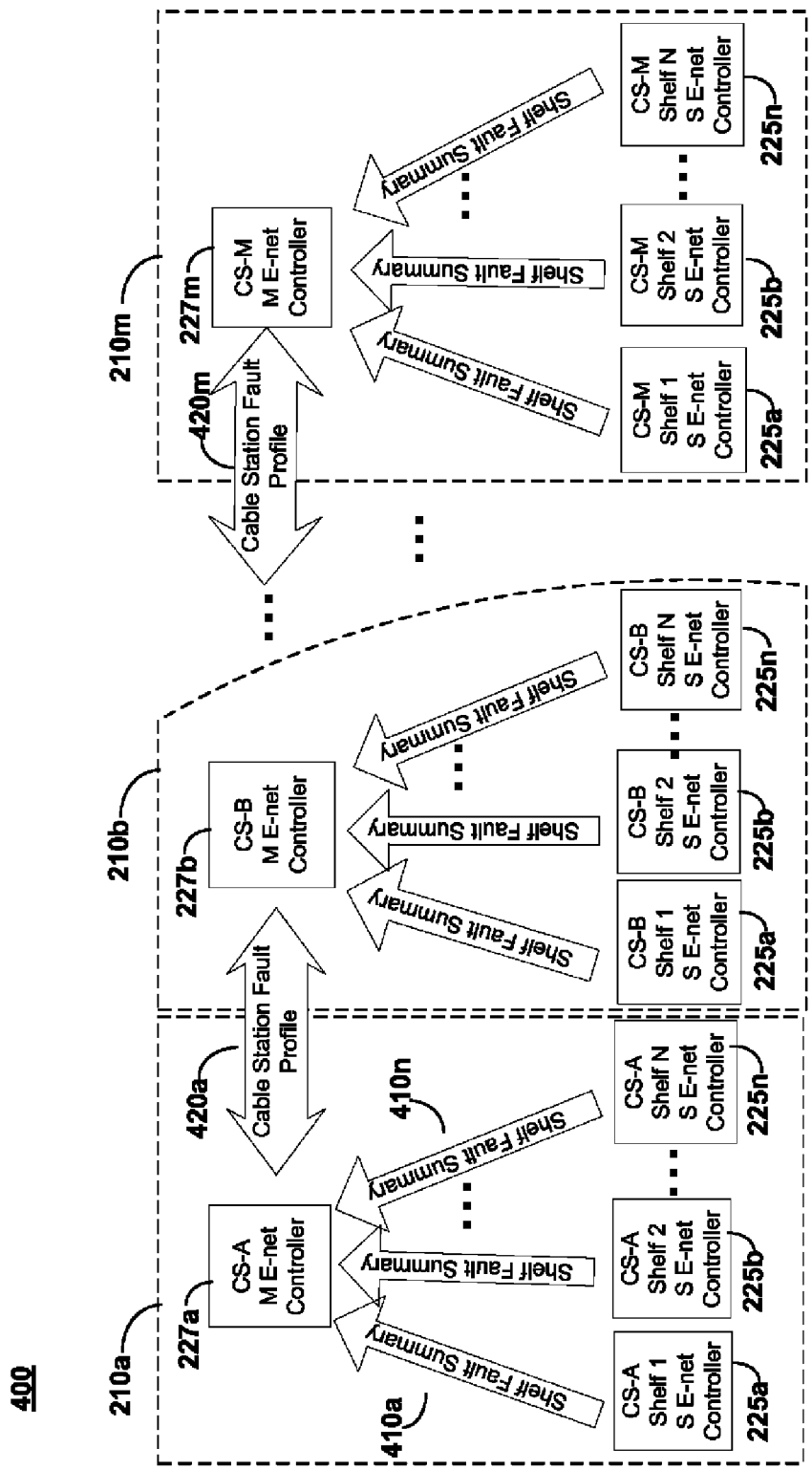
FIG. 4 is a block diagram illustrating aggregation and communication of detected faults consistent with the present disclosure.

FIG. 4 illustrates an example 400 of the flow of fault information between shelf controllers 225a . . . 225n, master controllers 227a . . . 227m and a plurality of cable stations 210a . . . 210m. Each cable station 210a . . . 210m may include a master controller 227a, 227b . . . 227m. Each master controller 227a, 227b . . . or 227m may be coupled to a plurality of shelf controllers 225a . . . 225n configured to detect faults, e.g., degraded or lost signals on one or more channels. The shelf controllers 225a, . . . , 225n may be configured to aggregate the faults into a shelf fault summary 410a, . . . , 410n for each shelf 220a, . . . , 220n and to communicate each shelf fault summary 410a, . . . , 410n to the master controller 227a for the cable station, e.g., cable station 210a. Each local master controller 227a, . . . , 227m may be configured to communicate a cable station fault profile 420a, . . . , 420m to one or more remote master controllers 227a, . . . , 227m located at one or more cable stations 210a, . . . , 210m.

With reference again to FIG. 3B, if a local fault did not occur, the local master controller may determine 345 whether a remote fault has occurred. For example, the local master controller may poll the remote master controllers for notification of faults. In another example, one or more remote master controllers may notify the local master controller when a reportable fault has occurred. If a remote fault has not occurred, process flow may return to monitoring 315 local faults.

If a remote fault has occurred, the local master controller may then determine 350 whether a set of one or more remote reported faults corresponds to a provisioned recovery profile. A set of remote reported faults may include a reporting master controller identifier and an alarm signature or alarm signature identifier for each remote reported fault. For example, the local master controller may determine whether the set of remote reported faults corresponds to a provisioned recovery profile by comparing the set of remote reported faults with a fault signature, e.g., fault signature 274, of each recovery profile in recovery data, e.g., provisioned recovery data 244a, and determining whether the set of remote reported faults corresponds to the fault signature. A set of remote reported faults may be determined to correspond to a fault signature if the reporting terminal identifiers and the associated alarm signature identifiers of the set of remote reported faults correspond to those of a provisioned recovery profile. If the set of remote reported faults does not correspond to a provisioned recovery profile, a default remote fault function may be performed 353. For example, the default remote fault function may include increasing transmitted power on each channel. Process flow may then return to monitoring 315 local faults.

If the set of remote reported faults corresponds to a provisioned recovery profile, i.e., corresponds to a fault signature, the local master controller may perform 355 recovery steps designated in the provisioned recovery profile containing the corresponding fault signature. For example, recovery steps may include adjusting a channel transmitted power level, pre-emphasis, channel (frequency) selection and/or distribution of loading tones. In an embodiment, the local master controller may ignore additional fault reports while performing the recovery steps. The local master controller may then report a recovery 360 to the EMS and/or NMS. Process flow may then return to monitoring 315 local faults.

In this manner, detected faults may be communicated to one or more transmitting cable stations that may then implement recovery steps configured to mitigate or eliminate detected faults. The method may provide a "best effort" recovery without requiring that all transmitting cable stations implement their associated recovery steps.

Figure 5:
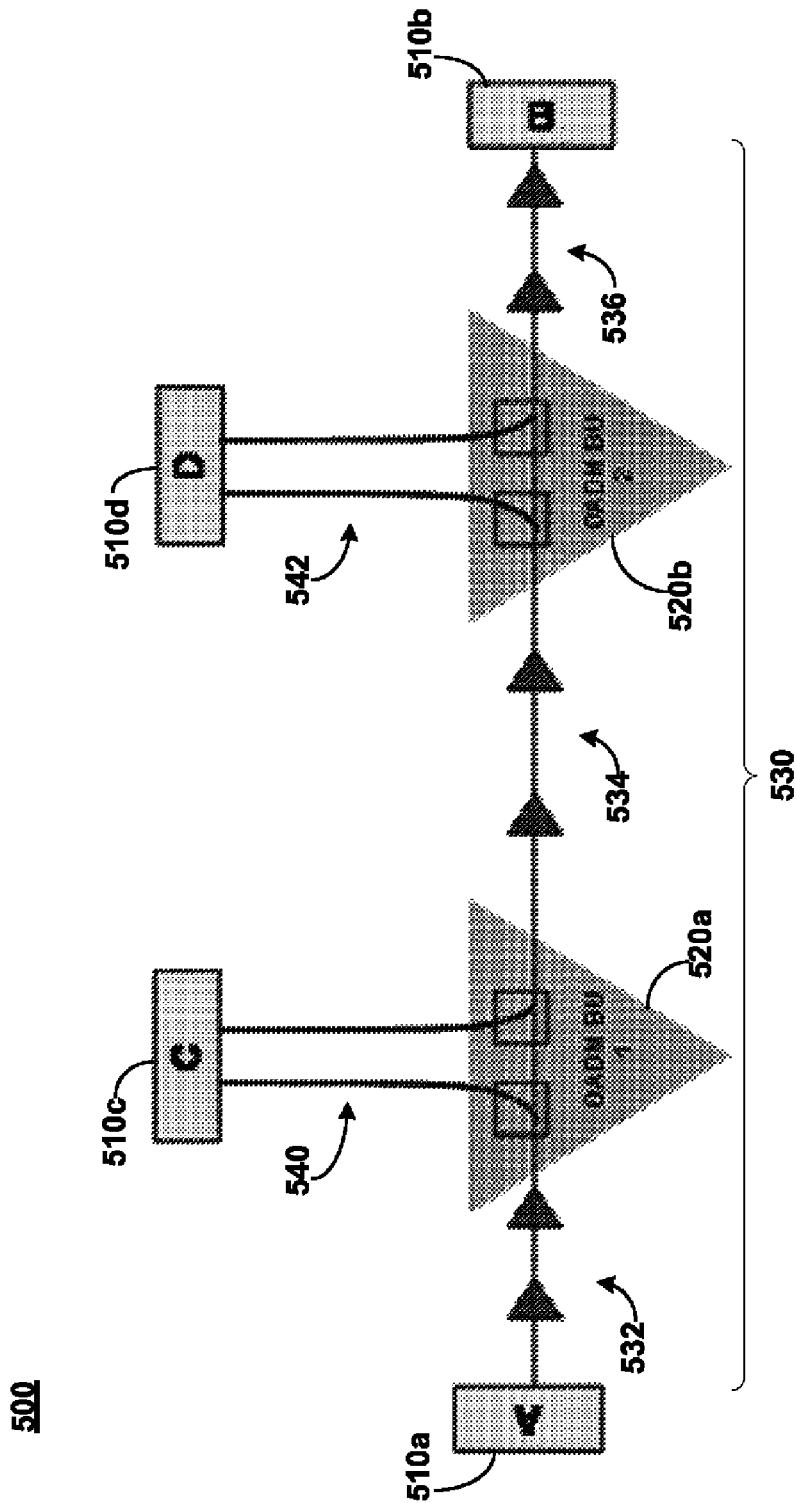
FIG. 5 is an example of an optical communication system for illustrating examples of distributed fault sensing and recovery consistent with the present disclosure.

Turning now to FIG. 5, there is provided an example of an optical communication system 500 consistent with the present disclosure. Two examples of distributed fault sensing and recovery consistent with the present disclosure will be described using the exemplary optical communication system 500. The examples may be best understood with reference to FIGS. 2A through 2D. The system 500 includes a plurality of cable stations: cable station A 510a and cable station B 510b, that may correspond to trunk terminals 110 and 120, respectively, and cable station C 510c and cable station D 510b, that may correspond to branch terminals 150 and 160, respectively. The system 500 includes a trunk path 530 coupling cable station A and cable station B. The system 500 further includes a first branching unit 520a and a second branching unit 520b configured to couple cable station C and cable station D to the trunk path 530. Each branching unit 520a, 520b includes an OADM configured to add and/or drop one or more communication channels. The trunk path 530 includes a plurality of cable segments 532, 534, 536 between a cable station and branching unit or between two branching units, i.e., between cable station A 510a and the first branching unit 520a, between the first and second branching units 520a, 520b and between the second branching unit 520b and cable station B 510b. The system 500 includes a first branch path 540 between the first branching unit 520a and cable station C 510c and a second branch path 542 between the second branching unit 520b and cable station D 510d.

A fault may occur in any branch or cable path. In these examples, a fault has occurred in the first branch path 540, e.g., a cable has been damaged. The fault may be detected by at least receiving cable station B 510*b*. As described above, one or more shelf controllers and/or a master controller at cable station B may detect alarms from one or more associated network elements. These alarms may be aggregated and provided to the local master controller for cable station B. The local master controller may combine the aggregated alarms and may determine whether the combined and aggregated alarms correspond to an alarm signature contained in provisioned fault data 242*b*. For example, an alarm signature may correspond to a loss of signal for network elements NE1, NE2 . . . NEn. These network elements may be associated with signals originating at and/or passing through cable station C 510*c*. This alarm signature may be associated with a fault profile, e.g., fault profile CS-B-1. Fault profile CS-B-1 may designate cable stations A and D as cable stations to be notified in its list of designated transmitting terminals 256. The master controller at cable station B may then report to master controllers at cable stations A and D that the alarm signature associated with fault profile CS-B-1 has been detected. Each report may include a reporting terminal identifier. For example, the master controller at cable station B may communicate with the master controllers at cable station A 510*a* and cable station D 510*d* over the VLAN as described above.

Depending on the configuration of the channels and the nature of the fault, another cable station, e.g., cable station D 510*d*, may also detect the fault in the first branch path 540. For example, an alarm signature included in provisioned fault data 242*d* for cable station D may correspond to loss of signal for network elements NEn+1, NEn+2, . . . , N. The alarm signature may be associated with a fault profile, e.g., fault profile CS-D-5, that may designate cable station A as a cable station to be notified in its list of designated transmitting terminals. The local master controller at cable station D may then report to the master controller at cable station A that the alarm signature associated with fault profile CS-D-5 has been detected. The report may include a reporting terminal identifier.

The master controller at cable station A may then compare received fault reports with a recovery profile included in its provisioned recovery data 244*a*. For example, the master controller at cable station A may search for a recovery profile that includes in its fault signature, cable station identifiers and alarm signature identifiers corresponding to the reported faults. If the master controller at cable station A finds a corresponding fault signature, it may then implement the recovery steps associated with that recovery profile. For example, the recovery steps may include adjusting a power level of NE1 to a value, shutting off NE2, changing a frequency of NEn+1, etc.

In another example, a fault in the first branch path 540 may be detected by only cable station B 510*b*. The alarm signature in this example may correspond to an alarm signature associated with provisioned fault profile CS-B-2. This fault profile may designate cable stations A and D as cable stations to be notified. In this example, the master controller at cable station B may report the alarm signature associated with fault profile CS-B-2 in a fault report 245 both cable stations A and D. For example, the report 245 may include an alarm signature identifier for the alarm signature associated with fault profile CS-B-2. The report 245 may include cable station B's reporting terminal identifier. Cable stations A and D may receive no additional fault reports. In this example, the alarm signature associated with fault profile CS-B-2 may correspond to recovery profiles CS-A-2 at cable station A and CS-D-1 at cable station D. Recovery steps associated with both CS-A-2 and CS-D-1 may include adjusting a power level of NE1 to a value, shutting off NE2, changing a frequency of NE3, etc.

In this manner, based on detected alarms, provisioned fault data and provisioned recovery data, a fault may be detected and recovery may be initiated autonomously, i.e., without requiring input from an NMS, and in parallel, i.e., may be implemented by one or more transmitting terminals. The fault may be detected by a receiving terminal and recovery may be performed by one or more transmitting terminals without requiring that all provisioned transmitting terminals implement recovery steps and without requiring protection switching. Distributed fault sensing and recovery consistent with the present disclosure may result in a relatively fast, best effort recovery that maximizes the number of channels recovered.

According to one aspect of the present disclosure, there is provided a system for distributed fault recovery in a communication system including a plurality of cable stations. The system includes: a plurality of master controllers, each of the master controllers being associated with one of the cable stations, each of the cable stations configured to communicate with other of the cable stations along a communication path, each the master controller being configured for receiving local alarms indicating a fault in one or more network elements associated therewith, and each the master controller being provisioned with associated fault data and recovery data; a communication network between each of the master controllers, whereby each one of the master controllers is configured for receiving remote alarms from other ones of the master controllers, the remote alarms indicating a fault in one or more network elements associated with the other ones of the master controller. Each of the master controllers is configured for performing a fault recovery function for modifying communication between one or more of the cable stations on the communication path if the local alarms or the remote alarms correspond to a profile included in the fault data or the recovery data associated therewith.

According to another aspect of the disclosure, there is provided a communication system configured for distributed fault sensing and recovery. The system includes a plurality of cable stations; a plurality of master controllers, each of the master controllers being associated with one of the cable stations, each of the cable stations configured to communicate with other of the cable stations along a communication path, each the master controller being configured for receiving local alarms indicating a fault in one or more network elements associated therewith, and each the master controller being provisioned with associated fault data and recovery data; a communication network between each of the master controllers, whereby each one of the master controllers is configured for receiving remote alarms from other ones of the master controllers, the remote alarms indicating a fault in one or more network elements associated with the other ones of the master controller. Each of the master controllers is configured for performing a fault recovery function for modifying communication between one or more of the cable stations on the communication path if the local alarms or the remote alarms correspond to a profile included in the fault data or the recovery data associated therewith.

According to yet another aspect of the disclosure there is provided a method of establishing a fault recovery in a communication system including a plurality of cable stations. The method includes providing a master controller associated with each of the cable stations, each of the cable stations configured to communicate with other of the cable stations along a communication path, each the master controller being configured for receiving local alarms indicating a fault in one or more network elements associated therewith, and each the master controller being provisioned with associated fault data and recovery data; establishing a communication network between each of the master controllers whereby each one of the master controllers is configured for receiving remote alarms from other ones of the master controllers, the remote alarms indicating a fault in one or more network elements associated with the other ones of the master controllers; and configuring each of the master controllers for performing a fault recovery function for modifying communication between one or more of the cable stations on the communication path if the local alarms or the remote alarms correspond to a profile included in the fault data or the recovery data associated therewith.

The embodiments that have been described herein, however, are but some of the several which utilize this invention and are set forth here by way of illustration but not of limitation. Many other embodiments, which will be readily apparent to those skilled in the art, may be made without departing materially from the spirit and scope of the invention as defined in the appended claims.

What is claimed is:

1. A system for distributed fault recovery in a communication system including a plurality of cable stations, said system comprising:
    a plurality of master controllers, each of said master controllers being associated with one of said cable stations, each of said cable stations configured to communicate with other of said cable stations along a communication path, each said master controller being configured for receiving local alarms indicating a fault in one or more network elements associated therewith, and each said master controller being provisioned with associated fault data and recovery data; and
    a communication network between each of said master controllers, whereby each one of said master controllers is configured for receiving remote alarms from other ones of said master controllers, said remote alarms indicating a fault in one or more network elements associated with said other ones of said master controllers,
    each of said master controllers being configured for performing a fault recovery function for modifying communication between one or more of said cable stations on said communication path if said local alarms or said remote alarms correspond to a profile included in said fault data or said recovery data associated therewith.

2. The system according to claim 1, said system further comprising one or more shelf controllers associated with each of said master controllers, whereby each said master controller is configured to receive said local alarms from said one or more shelf controllers associated therewith.

3. The system according to claim 2, wherein each of said master controllers is configured to aggregate said local alarms from said one or more shelf controllers associated therewith for comparing said aggregated local alarms to said profile.

4. The system according to claim 1, wherein said profile is a fault profile comprising an alarm signature and a list of one or more transmitting terminal identifiers wherein each said transmitting terminal identifier designates one of said cable stations to be notified if said fault corresponds to said local alarms or said remote alarms.

5. The system according to claim 1, wherein said profile is a recovery profile comprising a fault signature and a recovery step wherein said fault signature comprises a reporting terminal identifier and an alarm signature identifier and said recovery step comprises an adjustment to a transmitter parameter.

6. The system according to claim 1, wherein said fault recovery function comprises adjusting a transmitter parameter, wherein said transmitter parameter is a parameter selected from the group consisting of: channel transmitted power level, pre-emphasis, frequency selection; and distribution of loading tones.

7. The system according to claim 1, wherein said communication system is an undersea communication system.

8. A communication system configured for distributed fault sensing and recovery comprising:
    a plurality of cable stations;
    a plurality of master controllers, each of said master controllers being associated with one of said cable stations, each of said cable stations configured to communicate with other of said cable stations along a communication path, each said master controller being configured for receiving local alarms indicating a fault in one or more network elements associated therewith, and each said master controller being provisioned with associated fault data and recovery data; and
    a communication network between each of said master controllers, whereby each one of said master controllers is configured for receiving remote alarms from other ones of said master controllers, said remote alarms indicating a fault in one or more network elements associated with said other ones of said master controllers,
    each of said master controllers being configured for performing a fault recovery function for modifying communication between one or more of said cable stations on said communication path if said local alarms or said remote alarms correspond to a profile included in said fault data or said recovery data associated therewith.

9. The system according to claim 8, said system further comprising one or more shelf controllers associated with each of said master controllers, whereby each said master controller is configured to receive said local alarms from said one or more shelf controllers associated therewith.

10. The system according to claim 9, wherein each of said master controllers is configured to aggregate said local alarms from said one or more shelf controllers associated therewith for comparing said aggregated local alarms to said profile.

11. The system according to claim 8, wherein said profile is a fault profile comprising an alarm signature and a list of one or more transmitting terminal identifiers wherein each said transmitting terminal identifier designates one of said cable stations to be notified if said fault corresponds to said local alarms or said remote alarms.

12. The system according to claim 8, wherein said profile is a recovery profile comprising a fault signature and a recovery step wherein said fault signature comprises a reporting terminal identifier and an alarm signature identifier and said recovery step comprises an adjustment to a transmitter parameter.

13. The system according to claim 8, wherein said fault recovery function comprises adjusting a transmitter parameter, wherein said transmitter parameter is a parameter selected from the group consisting of: channel transmitted power level, pre-emphasis, frequency selection; and distribution of loading tones.

14. The system according to claim 8, wherein said communication system is an undersea communication system.

15. A method of establishing a fault recovery in a communication system including a plurality of cable stations, said method comprising:
- providing a master controller associated with each of said cable stations, each of said cable stations configured to communicate with other of said cable stations along a communication path, each said master controller being configured for receiving local alarms indicating a fault in one or more network elements associated therewith, and each said master controller being provisioned with associated fault data and recovery data;
- establishing a communication network between each of said master controllers whereby each one of said master controllers is configured for receiving remote alarms from other ones of said master controllers, said remote alarms indicating a fault in one or more network elements associated with said other ones of said master controllers; and
- configuring each of said master controllers for performing a fault recovery function for modifying communication between one or more of said cable stations on said communication path if said local alarms or said remote alarms correspond to a profile included in said fault data or said recovery data associated therewith.

16. The method according to claim 15, wherein each said master controller is configured to receive said local alarms from a plurality of shelf controllers associated therewith.

17. The method according to claim 15, wherein said profile is a fault profile comprising an alarm signature and a list of one or more transmitting terminal identifiers wherein each said transmitting terminal identifier designates one of said cable stations to be notified if said fault corresponds to said local alarms or said remote alarms.

18. The method according to claim 15, wherein said profile is a recovery profile comprising a fault signature and a recovery step wherein said fault signature comprises a reporting terminal identifier and an alarm signature identifier and said recovery step comprises an adjustment to a transmitter parameter.

19. The method according to claim 15, wherein said fault recovery function comprises adjusting a transmitter parameter, wherein said transmitter parameter is a parameter selected from the group consisting of: channel transmitted power level, pre-emphasis, frequency selection; and distribution of loading tones.

20. The method according to claim 15, wherein said communication system is an undersea communication system.

* * * * *